United States Patent Office 2,727,070
Patented Dec. 13, 1955

2,727,070

SUBSTITUTED PROPANOLS AND PROCESSES FOR THEIR MANUFACTURE

Robert Michel Jacob, Ablon-sur-Seine, France, assignor, by mesne assignments, to Parke, Davis & Company, Detroit, Mich., a corporation of Michigan No Drawing. Application February 23, 1951,
Serial No. 212,482

Claims priority, application France February 25, 1950

9 Claims. (Cl. 260—562)

This invention relates to new substituted propanols and to processes for their preparation.

It is an object of the present invention to provide new substituted propanols which are of value as intermediates for the production of therapeutically important substances as will be more particularly described hereinafter. A further object is to provide novel and commercially useful processes for the preparation of these propanols.

The substituted propanols of the present invention conform to the conventional formula:

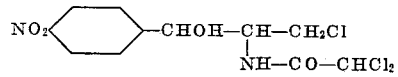

This formula includes two structurally different forms, the term "structurally" referring to the spatial relationship of the polar groups respectively attached to the two asymmetric carbon atoms. By analogy with the nomenclature adopted by Rebstock et al. (J. A. C. S. vol. 71, pp. 2458–2473) in connection with the diastereoisomeric amido - diol, 2 - dichloracetamido - 1 - p - nitrophenyl - propane 1:3-diol, an isomer of which is known by the common name "Chloramphenicol" the structural isomeric forms are herein referred to as "erythro" and "threo" respectively. Both the erythro and the threo forms can exist as racemates of optically active isomers giving a total of six different forms. The foregoing structural formula of conventional type includes, therefore, the complete mixture of all six forms, the racemates of the erythro and threo series and the four individual isomers L-erythro, D-erythro, L-threo and D-threo. It should be noted that the configurational representation of the isomers as D and L bears no relation to the actual sign of the rotation but refers to the configuration about the alpha carbon atom. The D-threo compound has the same configuration with respect to the alpha carbon atom as the therapeutically active isomer of chloramphenicol which has been designated D(—)-threo 2-dichloracetamido-1-p-nitrophenylpropane 1:3-diol.

According to a feature of this invention, the new compounds are prepared by reducing an α-dichloracetamido-β-chloro-p-nitropropiophenone of the formula:

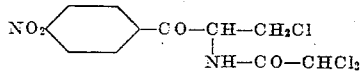

by the Meerwein method using an oxidisable aluminium alkoxide, preferably an aluminium alkoxide derived from an aliphatic secondary alcohol such as aluminium isopropoxide and under anhydrous conditions employing an inert organic solvent, conveniently a lower aliphatic alcohol corresponding to hte alkyl radical contained in the alkoxide. The yield obtained in this process consists predominately of the DL-, D- or L-erythro forms respectively according to whether the propiophenone has the dl-, l- or d- form.

According to a further feature of the invention, the new racemic erythro compound is prepared by the fission of the racemic erythro 2-dichloromethyl-4-p-nitrophenyl-hydroxymethyl-Δ²-oxazoline of the conventional formula:

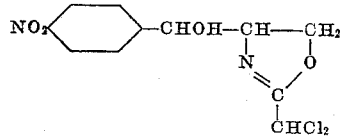

by treatment with hydrogen chloride under anhydrous conditions, being conveniently effected in an inert organic solvent medium, such as dioxane. The reaction may be effected at room or elevated temperature; for example it may be effected on the water bath. The oxazoline may be prepared by the process described in the specification of co-pending application Serial No. 199,936 by treating 1-p-nitrophenyl-2-aminopropane-1:3-diol with dichloracetiminoether.

According to a still further feature of the invention, the threo forms are prepared by the careful hydrolysis of the threo forms of the 2-dichloromethyl-5-p-nitrophenyl-4-chloromethyl-Δ²-oxazoline having the conventional formula:

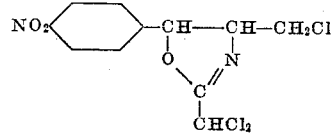

This is achieved by treating the oxazolines with dilute mineral acid, conveniently dilute hydrochloric acid or dilute sulphuric acid, and subsequently neutralising the reaction mixture with a base such as aqueous ammonia.

The threo forms of the said oxazoline may be conveniently prepared for example by treatment of the erythro forms of 2-dichloracetamido-1-p-nitrophenyl-3-chloropropane 1-ol with strong sulphuric acid, in which case the hydrolysis of the oxazoline may be carried out without actual isolation of the oxazoline viz, by dilution of the solution and, preferably, the erythro compound is dissolved in strong sulphuric acid (for example acid of 66° Bé. strength gives satisfactory results) the resultant solution is warmed for a short while at a temperature not exceeding about 45° C., and after dilution e. g. by pouring the solution onto a mass of crushed ice and with the temperature kept at around 0° C. the solution is neutralised, preferably with aqueous ammonia. While aqueous ammonia is the neutralising agent of choice, other bases such as alkali metal and alkaline earth metal hydroxides and strong organic bases such as triethylamine may be employed. An excess of a strong base should be avoided as the end product is sensitive to alkali.

In a preferred embodiment of the present invention, DL- or D-threo 2-dicholoracetamido-1-p-nitrophenyl-3-chloropropane 1-ol is prepared from the DL- or L-erythro epimer by the process of epimerisation described in the last preceding paragraph, the erythro epimers being prepared from the DL- or L-erythro oxazoline of the aforesaid formula or, in the case of the DL compound from the dl-propiophenone of the aforesaid formula.

It is also possible to prepare the threo oxazolines of the formula:

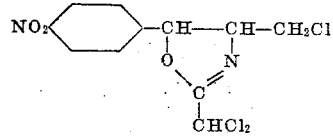

by the action of a dilute aqueous solution of an alkali metal hydroxide on the corresponding 2-dichloracetamido-1:3-dichloro-1-p-nitrophenylpropanes as described in the specification of copending application Serial No.

221,335. In this case, the hydrolysis can conveniently be effected by dissolving the oxazoline in an inert organic solvent such as dioxane, adding dilute hydrochloric acid and basifying the reaction mixture with an excess of dilute aqueous ammonia at a temperature of about 0° C., when the required product crystallises out.

The new compounds of the present invention, particularly the DL- and L-erythro and DL- and D-threo forms, constitute valuable intermediates for the preparation of chloramphenicol and the DL mixture of which it is the D- component. This can be accomplished by cyclicizing the 2-dichloracetamido-1-p-nitrophenyl-3-chloropropane-1-ol with dilute sodium hydroxide at room temperature to obtain a 2-dichloromethyl-4-p-nitrophenyl-hydroxymethyl-$\Delta^2$-oxazoline as described in copending applications Serial Nos. 212,481, now Patent No. 2,702,804, and 212,485, now abandoned. The said oxazoline can be dissolved in dilute hydrochloric acid at a temperature of 50° C. or below followed by neutralization with aqueous ammonia in the cold to obtain a 2-dichloracetamido-1-p-nitrophenylpropane-1,3-diol as described in the application of Ronald Slack Serial No. 199,937 filed December 8, 1950, now abandoned.

The present invention is illustrated by the following non-limitative examples.

Example I

In a Meerwein reduction apparatus, such as is described in "Organic Reactions" vol. II, p. 197, are heated 10.5 g. of dl-α-dichloracetamido-β-chloro-p-nitropropiophenone, 16 g. of aluminium isopropylate and 250 cc. of anhydrous isopropyl alcohol. 135 cc. of a mixture of acetone and isopropyl alcohol containing 1.6 g. of acetone are distilled off. After cooling, the contents of the flask are taken up with 90 cc. of 2 N sulphuric acid. 400 cc. of water are then added and a product is precipitated which is filtered off and dried in the air. This is extracted with ethyl acetate and by the addition of petroleum ether 5.6 g. of a crude product are precipitated, which, after recrystallisation from aqueous ethyl alcohol, melts at 133–134° C. and which is DL-erythro 2-dichloracetamido-1-p-nitrophenyl-3-chloropropane 1-ol.

The initial α-dichloracetamido-β-chloro-p-nitropropiophenone is prepared in the following manner: 50 g. of α-dichloracetamido-β-hydroxy-p-nitropropiophenone (see U. S. Patent 2,515,239) and 65 cc. of thionyl chloride are heated under reflux for 2 hours. The mixture is left to crystallise in the cold, filtered, washed with anhydrous ether and the product dried in vacuo over caustic potash. 42.7 g. of α-dichloracetamido-β-chloro-p-nitropropiophenone are obtained, melting at 137–140° C.

Example II

A fine suspension of 340 g. of dl-α-dichloracetamido-β-chloro-p-nitropropiophenone in 1.5 litres of anhydrous isopropyl alcohol is run during 2 hours into a boiling solution of 612 g. of aluminium isopropylate in 3 litres of isopropylate alcohol, a mixture of isopropyl alcohol and acetone distilling rapidly off. (Volume distilled=4 litres.) The residual red mass is poured onto crushed ice and acidified with dilute sulphuric acid until just acid to Congo red. The precipitate obtained is filtered off, washed with water and dried in the air, to give 278 g. of crude DL-erythro 2-dichloracetamido-1-p-nitrophenyl-3-chloropropane 1-ol of M. P. 127° C.

Example III

Following the method of the preceding example but with a suspension of 2 g. of levorotatory α-dichloracetamido-β-chloro-p-nitropropiophenone, M. P. 100–106° C. $(\alpha)_D^{22}=-13.3°$ ($c=4\%$ in ethyl acetate) in 25 cc. of isopropyl alcohol, and adding the suspension during 1 hour to 3.6 g. of aluminium isopropylate in 30 cc. of boiling isopropyl alcohol, there are obtained 1.45 g. of crude D-erythro 2-dichloracetamido-1-p-nitrophenyl-3-chloropropane 1-ol, M. P. 74–78° C. After recrystallisation from boiling methanol the product has the following characteristics: M. P.=101° C. $(\alpha)_D^{25}=+12.5°$ ($c=4\%$ in methanol).

Example IV 6.0 g. of DL-erythro 2-dichloromethyl-4-p-nitrophenyl-hydroxymethyl-$\Delta^2$-oxazoline of M. P. 167–168° C. are heated for 20 minutes on a water bath with 45 cc. of anhydrous dioxane containing 15% by weight of dry hydrogen chloride. Water (200 cc.) is then poured in, and the product which crystallises is filtered off, washed with water and dried in vauco over sulphuric acid. There are thus obtained 5 g. of DL-erythro 2-dichloracetamido-1-p-nitrophenyl-3-chloropropane 1-ol, M. P. 133–134° C.

Example V

Into 20 cc. of sulphuric acid (66° Bé.) there is added, in small portions and with cooling, 5 g. of DL-erythro 2-dichloracetamido-1-p-nitrophenyl-3-chloropropane 1-ol. The solution is then heated for 20 minutes at 45° C. After cooling, it is poured onto 80 g. of crushed ice. 65 cc. of methyl alcohol are then added to dissolve the thick precipitate which has formed. 88 cc. of aqueous ammonia (22° Bé.) are then added with vigorous cooling. The solution is then allowed to crystallise, the precipitate being then filtered off, washed with distilled water and dried in a vacuum desiccator over sulphuric acid. There is thus obtained 4.3 g. of DL-threo 2-dichloracetamido-3-chloropropane 1-ol, M. P. 135–136° C.

Example VI 0.70 g. of L-erythro 2-dichloracetamido-1-p-nitrophenyl-3-chloropropane 1-ol, M. P. 114–116° C. and $(\alpha)_D^{25}=-12.36°$ ($c=4\%$ in methanol), is dissolved at about 0° C. in 2.8 cc. of sulphuric acid (66° Bé.). The resultant solution is heated for 25 minutes at 45° C. and then poured onto 20 g. of crushed ice. 10 cc. of methanol are then added to facilitate dissolution of the acid sulphate of 2-amino-1-p-nitrophenyl-1-dichloracetoxy-3-chloropropane which has precipitated. The resultant solution is basified with aqueous ammonia (22° Bé.). The crystalline product obtained is filtered off, washed with water and then dried in a desiccator over sulphuric acid. There is thus obtained 0.55 g. of D-threo 2-dichloracetamido-1-p-nitrophenyl-3-chloropropane 1-ol, M. P. 126–127° C., $(\alpha)_D^{26}=+18.65°$ ($c=4\%$ in ethyl acetate) which after purification has the following characteristics: M. P. 130–131° C., $(\alpha)_D^{23}=+20.7°$ ($c=4\%$ in ethyl acetate).

Example VII 0.19 g. of crude D-erythro 2-dichloracetamido-1-p-nitrophenyl-3-chloropropane 1-ol, M. P. 79° C. and $(\alpha)_D^{25}=+10.40°$ ($c=4\%$ in methanol) is treated by the method of Example VI. There is thus obtained 0.12 g. of L-threo 2-dichloracetamido-1-p-nitrophenyl-3-chloropropane 1-ol, M. P. 125–128° C. and $(\alpha)_D^{23}=-18.8°$ ($c=2\%$ in ethyl acetate) and which after purification has the following characteristics: M. P. 130–131° C., $(\alpha)_D^{23}=-21.8°$ ($c=4.6\%$ in ethyl acetate).

Example VIII 3.6 g. of D-threo 2-dichloromethyl-4-chloromethyl-5-p-nitrophenyl-$\Delta^2$-oxazoline, $(\alpha)_D^{20}=+17.3°$ ($c=5\%$ in ethyl acetate) are dissolved in 12 cc. of dioxane. There is then added 33 cc. of N hydrochloric acid and 18 cc. of water. With cooling on a bath of ice-water, the solution is basified with an excess of aqueous ammonia. A product crystallises which is filtered off, washed with water and dried in vacuo. There is thus obtained 3.1 g. of crude D-threo 2-dichloracetamido-1-p-nitrophenyl-3-chloropropane 1-ol, M. P. 127° C. which after recrystallisation from aqueous methanol has the following characteristics:

M. P. 131° C. $(\alpha)_D^{20} = +20.39°$ ($c=4\%$ in ethyl acetate).

*Example IX*

Following the procedure of Example VIII using 0.36 g. of DL-threo 2-dichloromethyl-4-chloromethyl-5-p-nitrophenyl-$\Delta^2$-oxazoline, M. Pt. 94.5 to 97° C. with the corresponding quantities of dioxane, hydrochloric acid and ammonia, there is obtained DL-threo 2-dichloracetamido-1-p-nitrophenyl-3-chloropropane 1-ol, M. Pt. 136° C.

I claim:

1. A substituted propanol having the formula:

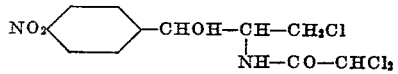

2. DL-erythro 2 - dichloracetamido-1-p-nitrophenyl-3-chloropropane 1-ol.

3. DL-threo 2-dichloracetamido - 1 - p - nitrophenyl-3-chloropropane 1-ol.

4. A process for the epimerisation of the erythro forms of 2 - dichloracetamido-1-p-nitrophenyl-3-chloropropane 1-ol which comprises treating the same with strong sulphuric acid and neutralising the reaction mixture with a base of the class consisting of alkali metal hydroxides, alkaline earth metal hydroxides, ammonium hydroxide and triethylamine.

5. A process as claimed in claim 4 wherein the erythro propanol is dissolved in strong sulphuric acid, the solution is heated for a short while at a temperature not substantially greater than about 45° C., diluted with water and then neutralised at substantially 0° C. with aqueous ammonia.

6. D - threo - 2 - dichloracetamido - 1 - p - nitrophenyl-3-chloropropane-1-ol.

7. D-erythro - 2 - dichloracetamido - 1 - p - nitrophenyl-3-chloropropane-1-ol.

8. L - threo - 2 - dichloracetamido - 1 - p - nitrophenyl-3-chloropropane-1-ol.

9. Process which comprises treating an erythro compound having the formula

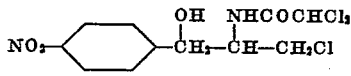

with strong sulfuric acid at a temperature not substantially greater than about 45°, diluting with water and neutralizing with an alkali hydroxide thereby producing the corresponding compound in threo form.

References Cited in the file of this patent

UNITED STATES PATENTS

| | | |
|---|---|---|
| 2,513,346 | Moersch et al. | July 4, 1950 |
| 2,514,376 | Crooks et al. | July 11, 1950 |
| 2,515,241 | Long | July 18, 1950 |

OTHER REFERENCES

Long et al.: "J. Am. Chem. Soc." vol. 71, July 1949, pp. 2473–75.